Inventor
Wolfgang Herkenberg
By William D. Lee, Jr.
Attorney

June 2, 1970  W. HERKENBERG  3,515,174
APPARATUS FOR TREATING THERMOPLASTIC FABRIC DURING WEAVING
Filed Jan. 18, 1968  4 Sheets-Sheet 4

Inventor
Wolfgang Herkenberg
By William D. Lee Jr.
Attorney

United States Patent Office 3,515,174
Patented June 2, 1970

3,515,174
APPARATUS FOR TREATING THERMOPLASTIC FABRIC DURING WEAVING
Wolfgang Herkenberg, Ontario, Canada, assignor, by mesne assignments, to Thiokol Chemical Corporation, Bristol, Pa., a corporation of Delaware
Filed Jan. 18, 1968, Ser. No. 698,864
Int. Cl. D03d *49/00*
U.S. Cl. 139—291         1 Claim

ABSTRACT OF THE DISCLOSURE

Thermoplastic fabric is continuously heat treated as it is woven while free shrinkage and longitudinal tension are prevented so that the fabric will not develop unmanageable shrinking tendencies during later use.

---

This invention relates to a method and apparatus for treating thermoplastic fabric as it is woven. In particular, the invention relates to preventing undesirable shrinkage of woven, heat treated, polypropylene fabric.

Most thermoplastic fabrics will tend to shrink when unsuspended and exposed to heat. If the fabric is subjected to a heating process during a subsequent operation in manufacturing, the shrinkage that takes place becomes a serious problem. For instance, in the manufacture of tufted carpeting using a woven thermoplastic material as a primary backing a latex coating is usually applied which requires drying at elevated temperatures. Also, a secondary backing is sometimes applied which requires bonding with a heating process. Still another application of heat can come if the carpet is dyed in a hot liquid dye. During these operations in which heat is applied the primary carpet backing is usually held at its edges along its width by the pins of a tenter frame. After release from the tenter frame the carpet may shrink 1″ to 3″ in a 12 ft. width.

To eliminate the shrinking problem one prior art method has been to run the fabric through a tenter frame under the presence of heat in an oven close to the softening temperature of the synthetic fabric. In such a tenter frame the fabric is held at its edges on pin chains or clip chains. The fabric can be pre-shrunk by permitting the entry width of the fabric to be lost to some extent during the tentering process. This is effected by permitting the chains to be closer together at the ends of the tenter oven as compared to the distance the chains were apart when the fabric entered the tenter frame. In such a "pre-shrinking" process it is theorized that a process of internal molecular realignment occurs in the weft or fill part of the fabric which can be compared to an annealing process. The cross-linkage character of the molecules is reduced and the longitudinal linkage is increased. The result is that in subsequent operations as described above which require the application of heat the fabric will be less responsive to shrinkage than if it had not been heat treated or "pre-shrunk."

Another prior art method is to securely hold the fabric without a loss in width between the pin tenters as the fabric passes through a heat zone. In this instance shrinkage still occurs but since the fabric cannot lose width it instead thins out and becomes very flat. In both of the aforementioned prior art heat treating methods the desirable shrinkage characteristics have been obtained in operations after weaving, causing additional handling and operation costs. Therefore, it is an object of the present invention to reduce the cost normally involved when heat treating woven thermoplastic fabrics separately.

This and many other objects are achieved in the present invention in which the heat treatment is given to the woven thermoplastic fabric as it comes from the loom. The method comprises passing the fabric over a constant temperature drum having a rough surface which does not permit fabric shrinkage while heating the fabric by radiant heat, reducing the longitudinal tension on the fabric while it is being heat treated, and tightly winding up the fabric while maintaining low tension in the portion of the fabric being heat treated. This method, the novel apparatus for performing the method, and the product consequently produced constitute the present invention and can be better understood by reference to the follow detailed description and drawings in which:

The fabric used in the following detailed description of the present invention is one woven from polypropylene ribbon. It is understood that mono-filaments and multi-filaments could be used as well as ribbons in the present invention. Also, any synthetic woven fabric requiring heat treatment would be within the scope of the invention.

Figure 1:
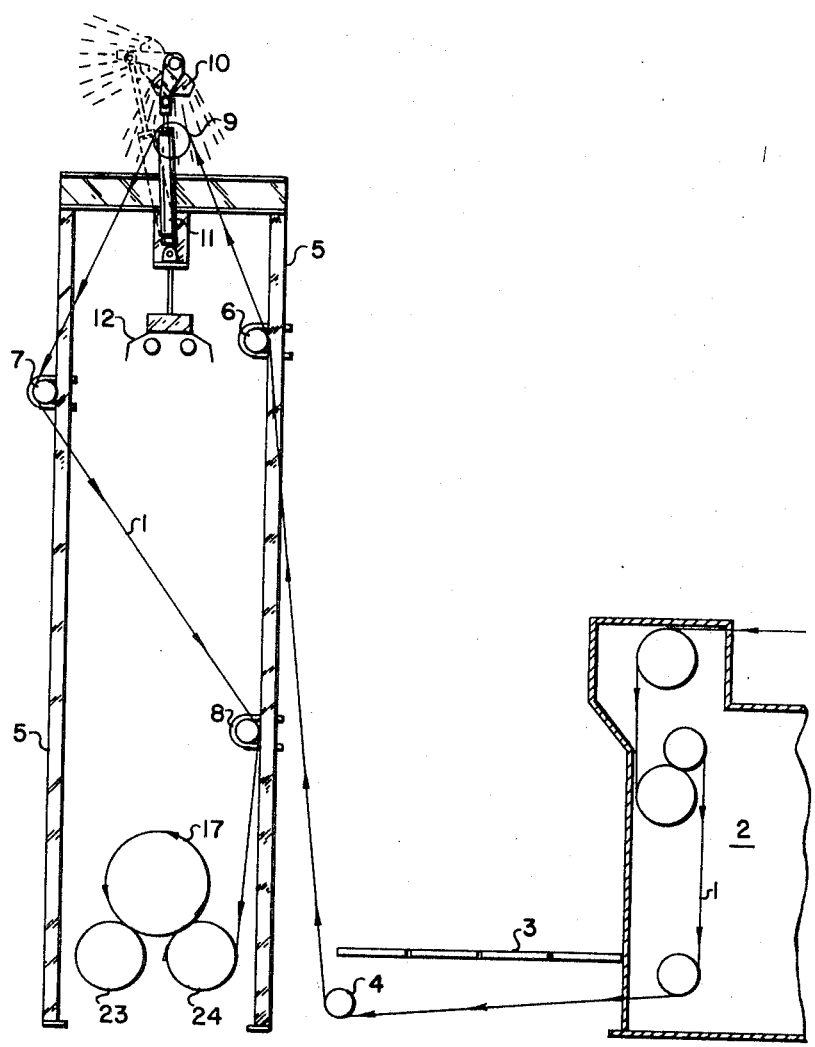
FIG. 1 shows in schematic fashion the arrangement of the loom, the heat treating apparatus, and the windup apparatus.
Figure 6:
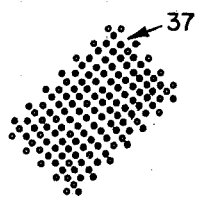
FIG. 6 is a detailed view of the surface of the roll shown in FIG. 5.
Figure 7:
FIG. 7 shows a cross-section of the surface material for the roll shown in FIG. 5.

Referring now to FIG. 1, woven fabric 1 is seen passing through loom 2. The fabric has been completely woven as it leaves loom 2 and passes under the loom operator's platform 3 and makes a turn around guide roll 4. The fabric now goes up over fixed bow pipe 6 which prevents longitudinal creases. The fabric then passes over water cooled fillet wire covered roll 9 under radiant heaters 10. The fillet wire surface of roll 9 is similar to the roll surface shown in FIGS. 6 and 7.

Still referring to FIG. 1, the fabric has to make a turn of about 180° over roll 9 and the rough surface prevents fabric shrinkage during the time which the fabric, at weaving speed, is exposed to the heat from heater 10. It is necessary that roll 9 has a constant temperature and this is obtained by passing water through the inside of the roll. The temperature of roll 9 should not exceed 210° F. and should preferably be between 80° and 180° F.

Figure 2:
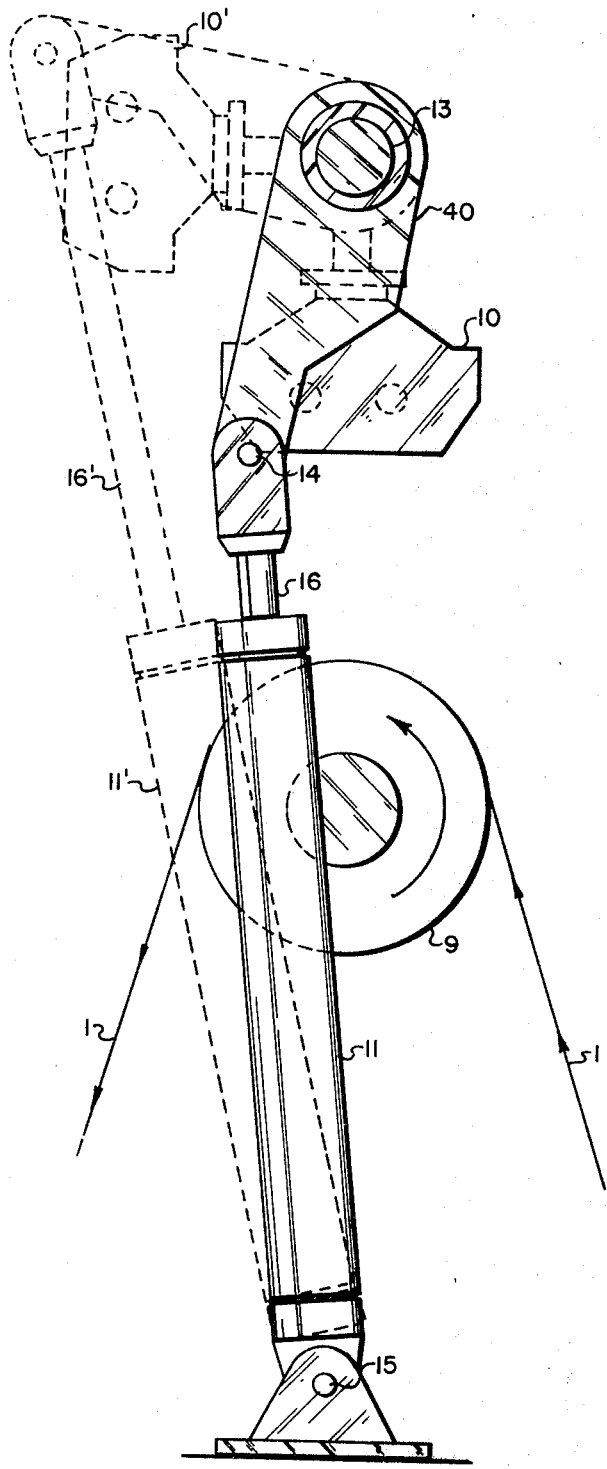
FIG. 2 shows in greater detail the mounting arrangement of the radiant heater used in the present invention.

In FIG. 2 the heater arrangement can be seen in greater detail. Pneumatic cylinder 11 is rotatably mounted on pivot 15. Connecting rod 16 which is driven by the piston (not shown) in cylinder 11 is attached by pivot 14 to plate 40. Plate 40 is secured to supporting shaft 13 which carries radiant heaters 10. Shaft 13 is also rotatably mounted. When in the position shown heaters 10 emit heat radiation directly onto fabric 1 which is passing over roll 9. For polypropylene the desired heat treating temperature is in the range of between 270° and 350° F. Looms are subject to intermittent operation and even when shut off radiant heaters still emit residual heat. Thus, when the loom operation is interrupted pneumatic cylinder 11 is actuated and connecting rod 16 is forced out causing radiant heaters 10 to swing to position 10′ shown in the dotted lines. The cylinder 11 and connecting rod 16 assume new poitions 11′ and 16′. Cylinder actuation as above described is easily effected by any means well known to the skilled artisan. For example, a relay switch (not shown) connected to the loom power driving means can be arranged such that on shut-down of the loom an electrical signal is sent to a control valve (also not shown). The control valve then directs air or hydraulic pressure from an appropriate source to power cylinder 11, causing cylinder 11 to become pressurized. Pressurization of cylinder 11 results in rod 16 extending changing position of heater elements 10 to the position shown in FIG. 2 by the dotted outline.

Returning now to FIG. 1, fabric 1 is seen passing over fixed bow pipes 7 and 8 as it leaves roll 9. The heater 10, roll 9, and the fixed bow pipes 6, 7, and 8, are all supported by frame 5. A fluorescent light 12 is provided so that a loom operator standing on platform 3 may visually inspect the fabric for imperfections which will be readily apparent from the light shining through the fabric.

Figure 3:
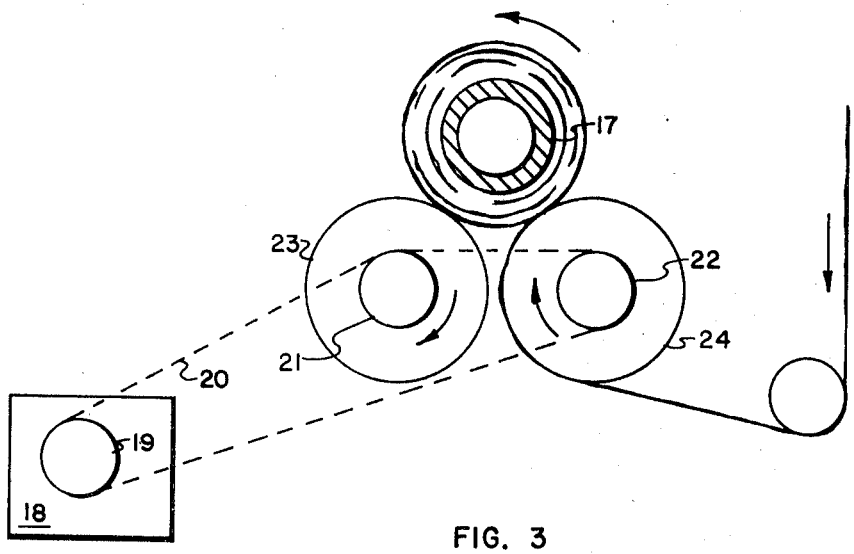
FIG. 3 shows one arrangement for winding up the heat treated fabric.
Figure 5:
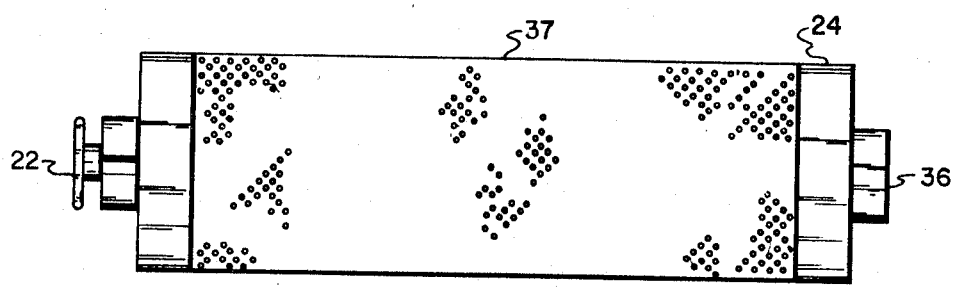
FIG. 5 shows a front view of one of the rolls which is seen on its end in FIG. 3.

Upon leaving fixed bow pipe 8 the fabric passes over roll 24 and is wound up on drum 17. The details of this windup apparatus may be better appreciated by viewing FIG. 3. Motor 18 is provided with drive sprocket 19 which, through chain 20, drives sprockets 21 and 22. Sprocket 21 turns roll 23, and sprocket 22 turns roll 24. Fabric 1 goes over roll 24 which is fillet wire covered as shown in FIG. 5. Roll 23 is of the same diameter as roll 24. The fabric is wound up by starting it on cardboard roll 17 which is rotated by the action of rolls 24 and 23. Roll 17 is mounted so that it is restrained from horizontal motion but can move vetrically as will be necessary as more fabric is wound onto the tube. Roll 23 turns at a greater speed than does roll 24. For example, sprocket 21 could have 23 teeth while sprocket 22 has 24 teeth. This causes roll 23 to be driven slightly faster than roll 24. By so doing a tension zone is created in the arc of the fabric as it leaves fillet wire covered roll 24 and is drawn onto tube 17 by fillet wire covered roll 23. Prior to encountering roll 24 fabric 1 was under essentially no longitudinal tension.

Figure 4:
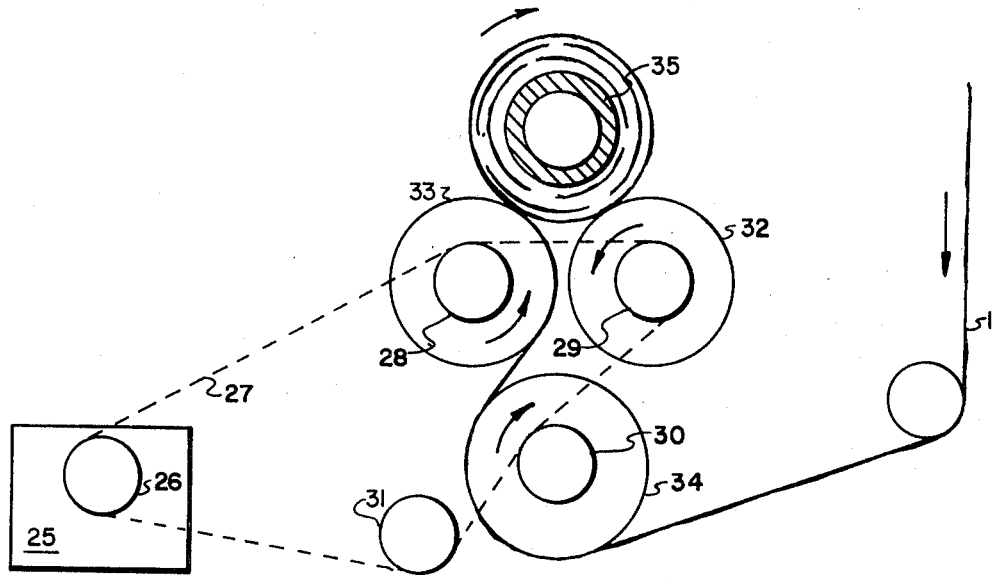
FIG. 4 shows a second arrangement for winding up the heat treated fabric.

If an additional tension zone is desired an arrangement such as shown in FIG. 4 may be employed. Motor 25 drives sprocket 26 which through chain 27 drives sprockets 28, 29, and 30. By way of example, sprocket 30 would have 24 teeth, sprocket 28 would have 23 teeth and sprocket 29 would have 22 teeth. Thus sprocket 29 would cause roll 32 to rotate at a greater speed than roll 33; and, in turn, roll 33 would rotate at a greater speed than roll 34. Since roll 33 is rotating more rapidly than roll 34 a tension zone is created in fabric 1 as it passes from roll 34 to roll 33. Rolls 32, 33, and 34 are fillet wire covered and are of the same diameter. The other tension zone is created, as before, by the fact that roll 32 is turning at a slightly greater speed than roll 33. Thus, the fabric 1 again encounters a tension zone, in its arc as it leaves roll 33 and is drawn onto tube 35 by roll 32.

The term "low tension," as used herein means tension that is substantially less than the tension in the fabric during and immediately after fabric formation. The reason for maintaining low tension in the fabric as it passes through the heating zone is to prevent excessive cooling of the fabric where it contacts the cooled roll. Thus, in FIG. 1 the tension must be low in the fabric as it goes across cool roll 9 under heaters 10. If the tension were high the physical contact of the fabric 1 with drum 9 would be very good thus increasing the transfer of heat from the fabric 1 to the drum 9. A fluctuation in tension would therefore introduce variations of shrink characteristics over the length of the fabric. The temperature of the roll, mentioned above, is essentially such that it does not effect the shrink value of the fabric; but, it is a constant temperature and creates a stable temperature background for the fabric as it passes over the roll during the heat treatment.

If the fabric is wound up with a low tension it will result in soft rolls of large diameter having unstable winding characteristics. Thus, tension zones were created in the windup of the roll as described above so that the fabric will continuously move from a zone of relatively low tension to one having sufficient tension to compact the windup roll. This is of great advantage to prior art methods where the fabric was taken off the loom, wound up, transported, and then unwound to undergo heat treatment. The present invention, therefore, provides for a continuous and less costly method of heat treating.

The through-put speed of the fabric in the embodiment of the invention being presently described is between 6 and 20 inches per minute. In this embodiment the heaters 10 (FIG. 1), are of the infra-red type, and are under power for fifteen seconds and are without power for a following interval of 15 seconds. This on and off process continues during the entire weaving operation. The thermal lag and buildup of a heat inventory in the radiant heaters is such that there is very little temperature fluctuation on the surface of the fabric. The movement of the heating elements 10 by means of the pneumatic cylinder 11 as described and by means herein before suggested, is a safety feature which prevents melting of the fabric should the loom be stopped. The apparatus and method described herein can be applied to any woven synthetic fabric which requires heat treating.

The fabric produced by the foregoing method and apparatus shows significantly lower shrinkage in the warp and weft immediately after windup of the fabric than the individual warp and weft yarns had immediately before weaving. Thus, a fabric is produced having reduced shrinkage without the necessity of a costly separate subsequent tentering operation.

The foregoing described invention is defined in the following claims.

I claim:
1. Apparatus for continuously heat treating synthetic fabric as it is woven comprising:
 (a) a frame;
 (b) bow pipes fixed on said frame for preventing longitudinal creasing in said fabric;
 (c) a cooled, temperature controlled roll mounted on said frame, said roll having a roughened surface for restraining the shrinkage in width of fabric passing thereover;
 (d) at least one radiant heater pivotally mounted above said temperature controlled roll whereby fabric passing over said roll will be heated;
 (e) means for moving said radiant heater away from said fabric in the event the motion of said fabric is stopped;
 (f) a first driven roll having a roughened surface for gripping fabric passing thereover;
 (g) a second driven roll, said second driven roll being adapted to be driven at a greater rotational speed than said first driven roll;
 (h) means for driving said first and second rolls; and,
 (i) a windup roll for receiving said fabric after it has passed over said first driven roll, said windup roll adapted to be driven by said second driven roll at a speed sufficient to create a tension zone in said fabric as it passes from said first driven roll to said windup roll.

References Cited
UNITED STATES PATENTS

| | | | |
|---|---|---|---|
| 1,966,331 | 7/1934 | Cameron | 242—66 |
| 2,354,952 | 8/1944 | Hornbostel | 242—66 |
| 3,134,158 | 5/1964 | Marks | 26—3 |

FOREIGN PATENTS

| | | |
|---|---|---|
| 958,614 | 5/1964 | Great Britain. |
| 964,934 | 7/1964 | Great Britain. |
| 1,006,944 | 10/1965 | Great Britain. |
| 1,033,276 | 6/1966 | Great Britain. |

ROBERT R. MACKEY, Primary Examiner

U.S. Cl. X.R.

26—1